United States Patent [19]

Prasser

[11] Patent Number: 5,456,244

[45] Date of Patent: Oct. 10, 1995

[54] COMBINATION COOK STOVE FLUID HEATER AND GREASE FILTER

[75] Inventor: Robert Prasser, Edwards, Colo.

[73] Assignee: Hydro Hoods Corporation, Denver, Colo.

[21] Appl. No.: 139,282

[22] Filed: Oct. 19, 1993

[51] Int. Cl.⁶ .................................................. F24C 15/20
[52] U.S. Cl. .............................. 126/299 D; 126/299 R; 165/166; 55/DIG. 36
[58] Field of Search ............... 126/299 R, 299 D, 126/299 A; 165/166; 99/403; 55/DIG. 36, 316, 220, 227

[56] References Cited

U.S. PATENT DOCUMENTS

| | | | |
|---|---|---|---|
| 3,260,189 | 7/1966 | Jensen | 98/115 |
| 3,698,378 | 10/1972 | Rosenberg et al. | 126/39 |
| 3,827,343 | 8/1974 | Darm | 165/166 |
| 4,050,368 | 9/1977 | Eakes | 98/115 |
| 4,084,745 | 4/1978 | Jones | 237/8 |
| 4,122,834 | 10/1978 | Jacobs | 126/299 |
| 4,175,614 | 11/1979 | Huggins | 165/95 |
| 4,235,220 | 11/1980 | Hepner | 126/299 |
| 4,769,149 | 9/1988 | Nobilet et al. | 210/603 |

FOREIGN PATENT DOCUMENTS

| | | |
|---|---|---|
| 829965 | 10/1975 | Belgium . |
| 899292 | 7/1984 | Belgium . |
| 003665981 | 9/1981 | European Pat. Off. . |
| 021809 | 10/1984 | European Pat. Off. . |
| 2443033 | 8/1980 | France . |
| 248703 | 11/1981 | France . |
| 522377 | 9/1976 | U.S.S.R. . |

*Primary Examiner*—Larry Jones
*Attorney, Agent, or Firm*—Sheridan Ross & McIntosh

[57] ABSTRACT

A combined self-cleaning grease and particulate filter and heat exchanger used to collect thermal energy normally vented through flue hoods or other ventilation systems in commercial or institutional kitchens. Fluid circulated within the filter/heat exchanger may then be utilized for heating other mediums, such as water or air. The filter/heat exchanger is provided with means for quick assembly and designed to replace existing grease filters, thus allowing economical retrofitting.

26 Claims, 3 Drawing Sheets

COMBINATION COOK STOVE FLUID HEATER AND GREASE FILTER

FIELD OF THE INVENTION

The present invention relates to a combined system which simultaneously filters grease and particulate from hot fumes and transfers heat to a fluid circulating inside the system. The heated fluid may then be used to supply heat for other purposes, such as heating water or air. In addition, the system of the present invention provides quick connect means for attaching sections of the combined heater/filter, allowing the system to be retrofitted in existing flue hood ventilation systems of varying dimensions in an economical manner.

BACKGROUND OF THE INVENTION

During the operation of commercial or institutional kitchens, a significant amount of valuable heat energy is lost as a result of hot fumes being vented to the atmosphere. These hot fumes are generated from cook stoves, hot plates, deep fat fryers, and other cooking apparatus. As a result of the extreme heat and various fumes generated during cooking, it is necessary for the comfort and health of kitchen workers to exhaust these fumes on a continuous basis through flue chimneys or similar venting devices. This process effectively replaces the hot kitchen air with cooler, clean outside air. Although this circulation process is necessary to provide a constant source of clean air to the kitchen environment, this venting practice is both inefficient and uneconomical, especially in colder climates where the cost to heat internal air and water is significant.

A further problem encountered in commercial kitchens is the filtering of grease and other particulates entrained in the hot fumes generated during the cooking of foods. If improperly filtered, this grease can cause fouling and the eventual malfunction of air ventilation systems, as well as create fire hazards if allowed to accumulate. Accordingly, hot fume air filters, which are normally located in fume hoods over cooking surfaces, are generally required to be cleaned daily, or at a minimum of 2–3 times a week. This tedious cleaning process is both time consuming and expensive.

The use of heat exchangers to capture thermal energy above cooking surfaces has been known for years. These designs, however, position the heat exchangers substantially downstream of existing grease filters. This approach is unfavorable for at least three reasons. First, these designs are inefficient since the heat exchanger is located downstream of the grease filter and a significant distance from the heat source. Thus, valuable thermal energy is lost by absorption into the grease filter and through general dissipation prior to the heat reaching the exchanger. Second, the grease filters currently being used upstream of the heat exchangers impede air flow, especially when congested with grease, hence reducing the efficiency of the air ventilation system and heat transfer efficiency. Third, when the heat source is turned off, the grease quickly solidifies on the filters and requires cleaning for both safety and efficiency. Finally, despite the existence of these kinds of heat exchangers generally, many existing kitchens fail to incorporate any kind of heat exchanger. Retrofitting existing kitchen equipment with heat exchanger systems may require an entirely new flue hood assembly and substantial piping and accessories. This conversion is both time consuming and expensive.

Accordingly, it is the primary object of this invention to provide a substantially self cleaning filter which is capable of filtering grease and other particulate matter from hot vapors and fumes generated during the cooking of foods. It is the further object of this invention to transfer heat from the hot cooking fumes to a fluid passing internally through the filter. This fluid may in turn be used to heat air or water for a variety of subsequent uses. By combining the heat exchanger and grease filter into one integral component, the heat transfer of thermal energy is more efficient since the heat exchanger is located closer to the heat source and eliminates the heat dissipating effects of an upstream grease filter. Additionally, the fluid within the filter retains heat after the heat source is turned off, allowing the grease to melt and drain away, thus reducing the frequency of cleanings. Finally, this combined heat exchanger/filter is designed to replace existing grease filters, and thus be retrofitted easily and at low cost, without the need for new flue hood assemblies.

SUMMARY OF THE INVENTION

The proposed combination heat exchanger and air filter provides means for both filtering grease and particulate matter entrained in cooking vapors, and capturing thermal energy in a fluid circulated throughout the filter. The fluid may then be utilized to heat water or air, depending on individual needs.

The combination heat exchanger/filter is designed to replace existing grease filters installed in flue hoods in commercial or institutional kitchens. By utilizing quick hydraulic couplings, the combination heat exchanger/filter may quickly be assembled to custom fit existing flue hoods by simply replacing the old grease filter and by supplying fluid access and removal. Thus, significant energy savings can be accomplished by replacing an existing grease filter with a combination air heater/filter, eliminating the need for purchasing an entirely new flue hood assembly. The retrofitting is thus fast, inexpensive, and energy efficient.

By combining the heat exchanger and air filter, a number of significant advantages are realized. First, the heat transfer efficiency between the heat source and fluid circulated within the filter is improved. This is a result of the close proximity between the heat source and heat exchanger when compared to currently existing systems, where the heat exchanger is located downstream of the grease filter and a significant distance from the heat source. Second, by circulating a cool fluid, such as water, closer to the heat source, heat is removed more quickly from the cooking line, lowering the surrounding ambient temperature. Third, the fluid within the filter retains heat for a sustained period of time after the heat source is turned off. Thus, by maintaining the fluid temperature at 20°–30° F. above the melting point of grease, with a thermocoupling or other temperature control device, the grease will continue to melt and self-drain, even after the heat source is turned off. This self-draining substantially eliminates the need for frequent cleanings of the grease filter. Finally, by combining the filter and heat exchanger, the air flow through the flue hood ventilation system is improved since there is less resistance from grease solidifying on the filter and impeding air flow.

DETAILED DESCRIPTION OF THE PREFERRED EMBODIMENTS

The subject invention combines a filter used for trapping and collecting grease and other particulates and a heat exchanger capable of capturing thermal energy generated from cooking equipment. This thermal energy is stored and transferred in a fluid circulated inside the heater/filter, and is eventually used to provide heat for other purposes in the kitchen or restaurant environment. By combining the two functions of filtering grease and capturing heat in one integral unit, commercial or institutional kitchen flue hoods may be retrofitted economically by merely replacing existing grease filters with a combined heater/filter. By combining the grease filter and heat exchanger, a number of additional advantages are realized, including enhanced heat exchanger efficiency, cooler temperatures on the cooking line for kitchen workers, and the ability of the grease filter to be substantially self-cleaning. Although the present invention is primarily applicable in commercial and institutional kitchen environments, the teachings may obviously be applied to a variety of settings where a heat source generates particulate matter which requires filtering. This may include industrial power plants, laboratories, or refineries, to name a few.

Figure 1:
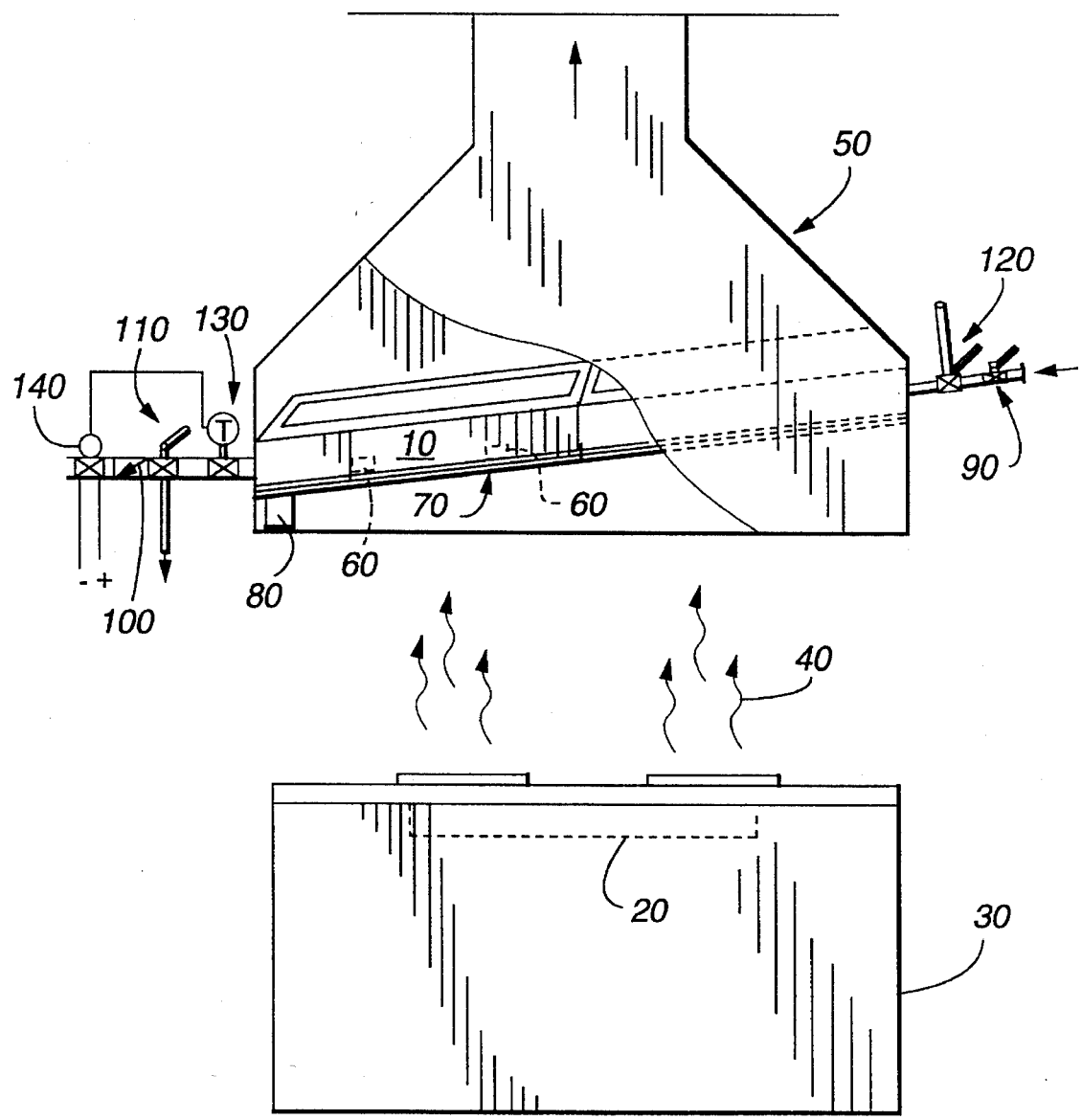
FIG. 1 is a front view of a typical commercial cooking apparatus embodying the features of the invention set forth herein, including a cooking surface and companion flue hood, partially broken away to reveal the combination heat exchanger/filter.

Referring now to the detailed drawings, FIG. 1 depicts a cooking stove and flue hood used in commercial or institutional kitchens. A combined heater/filter 10 is installed where a standard grease filter would normally be in place. Depending on the size of the existing flue hood, a plurality of heater/filters may be utilized to adapt to any variety of dimensions.

As thermal heat energy 20 is generated from a cook stove 30 or other cooking apparatus, hot grease, food particles, and other particulate matter 40 mix with hot air and are directed into a flue hood 50. The flue hood 50 captures and directs the hot gas, grease, and other particulate matter 40 through the filter 10, eventually venting hot air outside the kitchen environment. The ventilation of hot fumes from the kitchen environment serves a dual purpose. First, by replacing hot, contaminated inside air with cool, clean, outside air, a more comfortable working environment is created for kitchen employees. Second, by removing highly flammable grease from the immediate cooking area, the fire danger resulting from grease accumulation is reduced significantly.

Figure 2:
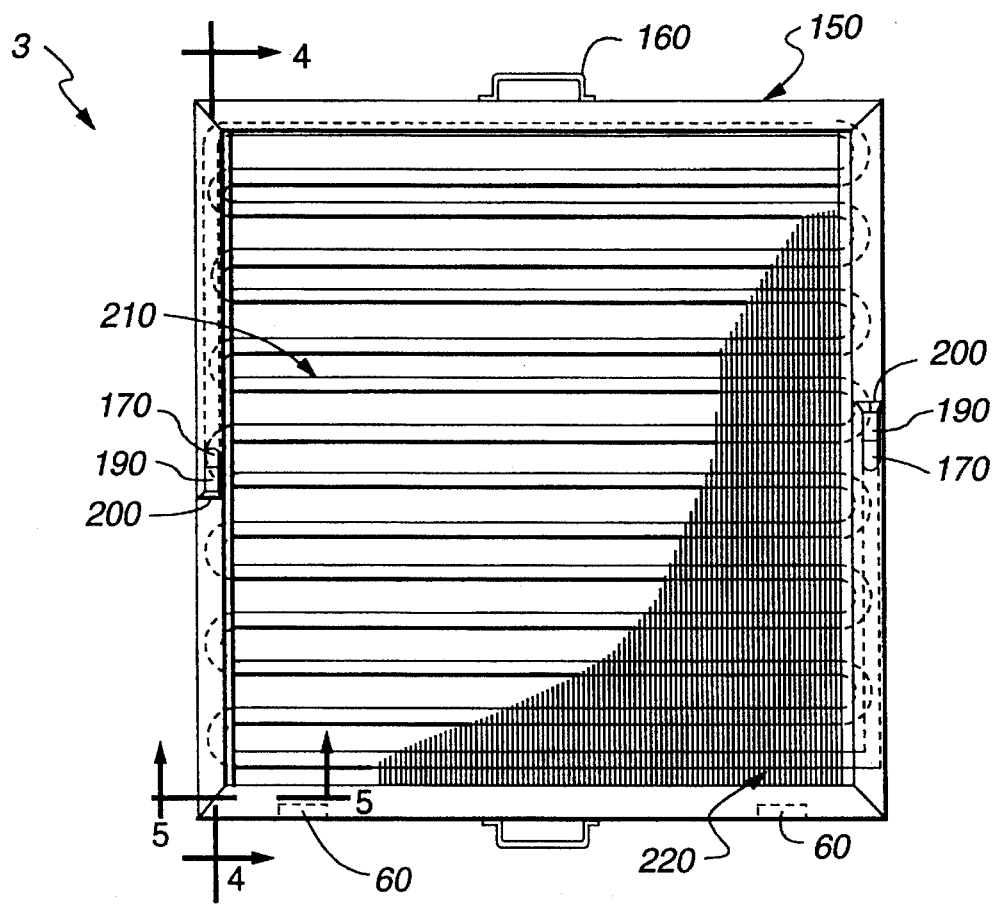
FIG. 2 is a top plan view of the combination heater/filter with the fins partially removed.
Figure 4:
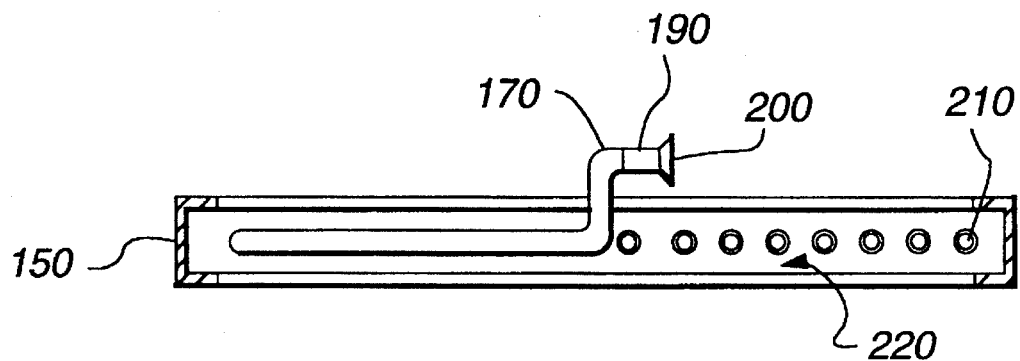
FIG. 4 is a cutaway cross-sectional view taken along line 4—4 of FIG. 2.
Figure 5:
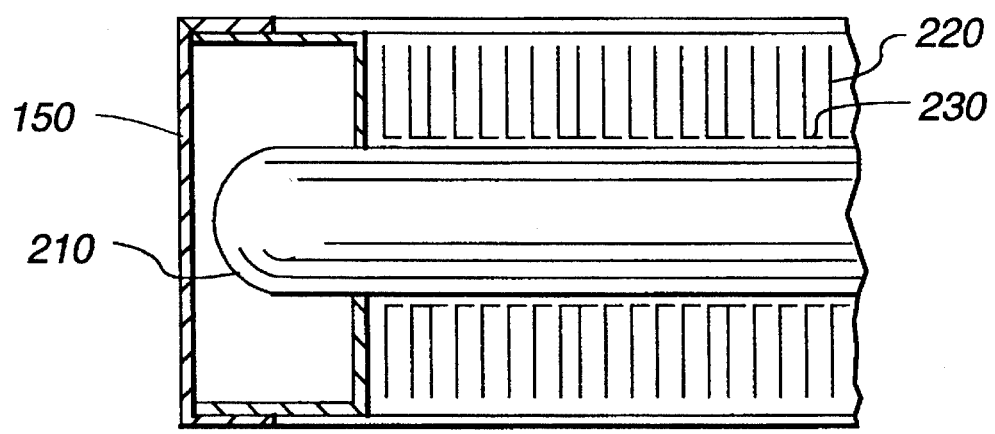
FIG. 5 is a cutaway cross-sectional view taken along line 5—5 of FIG. 2.

As grease and other particulate matter 40 generated during cooking are carried upward into the flue hood 50, these particles impinge on and are captured by the vanes of the heater/filter 10. This prevents the grease and other particulate matter from collecting and impeding air flow in the flue hood, which often contains a fan to improve the rate of ventilation. Although heat exchanging vanes are depicted in FIGS. 2, 4 and 5, any type of fin, vane or other heat conducting configuration known by one skilled in the art is suitable for converting heat to the fluid contained within the heater/filter 10. As the grease and other fine particulate matter 40 collect on the heater/filter 10, these particles eventually gravity feed in liquid form to the lower end of the heater/filter, which is installed at a slight angle. The grease and other particulate matter then drains through an opening or weephole 60 into a grease collection tray 70, and eventually feeds into a removable storage container 80 for disposal. In a preferred embodiment, a mason jar or other clear, non melting, nonflammable container is used which readily indicates when the container needs to be emptied or discarded.

In keeping with the principle objects of the invention, the heater/filter 10 contains a fluid, which is circulated inside the device. This fluid may be water, air or any other suitable fluid depending on what type of secondary heating needs exist in the commercial or institutional kitchen setting. In a preferred embodiment, water is introduced into the heater/filter 10, heated to a predetermined temperature, and then discharged to a hot water boiler for use in other applications such as washing dishes. In a further embodiment, water additives including but not limited to ethylene glycol may be added to the fluid to improve the heat transfer efficiency of the fluid. This fluid may then be circulated in pipes, a radiator, or other devices known in the art to transmit heat to ambient air.

The fluid entering the heater/filter 10 may be turned off with an upstream valve 90, allowing the unit to be operated without the heat exchanging capability and solely as a filter. Further, this embodiment is necessary during the installation, removal, or cleaning of the heater/filter 10. A ball valve, plug valve, butterfly valve or other type of valve commonly known by those skilled in the art may be used for this purpose. In a preferred embodiment, a low pressure ball valve with a teflon seat is used which may easily be identified by kitchen workers as being either open or closed.

In a like manner, downstream of the heater/filter 10 a flow control valve 100 may be installed to prevent fluid from backflowing into the flue hood 50 during the installation, removal, or cleaning of the heater/filter 10. In a preferred embodiment of the present invention, a check valve is installed which only allows fluid to flow in a downstream direction from the heater/filter 10.

Moreover, to prevent air from entering into and possibly contaminating the fluid circulating inside the heater/filter 10 and piping system, a bleed valve 110 may be installed downstream of the heater/filter 10. As heater/filters 10 are installed, they are initially void of any water and contain only air. To prevent the air from entering the closed system, the bleed valve 110 is opened until fluid is discharged, indicating that the heater/filter 10 has been purged of all air. In a preferred embodiment, a low pressure ball valve, plug valve, butterfly valve or other similar valve known in the art may be used to bleed air from the closed system.

In like manner, to purge the heater/filter of fluid prior to removal for cleaning or other purposes, an air intake valve 120 may be installed immediately upstream of the heater/filter to allow the introduction of air and remove all fluids. As a consequence, the weight of the heater/filter is reduced significantly, thus easing removal for kitchen workers. As appreciated by those skilled in the art, this air purge valve may be a ball valve or other suitable valve used in the industry.

In accordance with one of the main features of the present invention, the rate of fluid flow entering and exiting the heater/filter 10 is controlled by a temperature sensing device 130 which monitors the temperature of the fluid inside the heater/filter 10. As the temperature reaches a predetermined level, the temperature sensing device sends a signal to a variable orifice valve 140 which opens downstream of the heater/filter 10, allowing the discharge of fluid. In a preferred embodiment of the current invention, a thermocoupling or other device known in the industry may be used to monitor the temperature of fluid. Variable orifice valves or other similar devices commonly known in the industry may be used which automatically open and close based on the temperature of the fluid as monitored by the temperature sensing device.

The circulation of fluid inside the heater/filter 10 serves a plurality functions. First, the circulating fluid is located close to the thermal energy heat source 20, improving the efficiency of the system since the fluid is heated at a faster rate as compared to heat exchangers located a greater distance downstream in the flue hood 50. In a preferred embodiment, water within the heater/filter can be heated a minimum of 80° F. above the entry water temperature at a rate of at least about 4 gallons/min.

Second, by circulating cool fluid into the heater/filter 10 at a height immediately above the cooking surface, heat is transferred more rapidly into the fluid and the ambient temperature at the cooking line in the kitchen environment is maintained at a lower level. Furthermore, as cool fluid is initially introduced into the heater/filter 10, grease vapor condenses and collects more quickly, hence improving the filtering capability of the system.

Finally, by controlling the temperature of the fluid inside the heater/filter 10, heat mass can be stored after the thermal heat source 20, i.e., cooking equipment, is turned off. This allows grease to continue to melt and drain even after the thermal energy heat source 20 is turned off and no longer generating hot fumes, grease and particulate 40. The filter is thus substantially self-cleaning. In a preferred embodiment of the present invention, the temperature of the fluid inside the heater/filter is maintained at least about 25° F. above the melting point of grease during operation of the system, or at least about 150° F.

FIG. 2 illustrates the plan view of a heater/filter 10. A frame housing 150 with handles 160 supports an entry port 170, exit port 180, attachment hose 190, coupling valve 200, and conduit 210 for transferring a fluid between said ports and heat exchanging fins 220.

The frame housing 150 provides support for the components of the heater/filter 10 and handles 160 for carrying and transporting the filter in a convenient manner. The dimensions of the frame are specifically designed to permit the retrofitting of existing flue hoods in commercial or institutional kitchens by replacing existing grease filters with heater/filters. Depending on the size of the existing flue hoods, frame housings 150 may be placed in series to obtain the desired dimensions. In the present form of the invention, the frame housing 150 is constructed of a durable, non flammable material. In a preferred embodiment, the frame housing 150 is constructed of galvanized steel. Weepholes 60 are provided in the bottom of the frame housing 150 to drain grease and other particulate matter from the heater/grease filter 10. The grease and other particulate matter may then drain inside the flue hood grease containment tray 70 to a removable grease container 80.

In accordance with one of the principle objects of the invention, means are provided for a fluid to enter and exit the heater filter through an entry communication port 170 and an exit communication port 180 which extends through the frame housing 150. In a preferred embodiment of the present invention, these communication ports are oriented on opposite ends of the frame housing 150 and are constructed of copper pipe which extends from the conduit located inside the frame housing 150 to the exterior of the frame housing 150. The entry communication port or exit communication port may then be attached to a flexible hose 190 connected to a coupling device 200. In a preferred embodiment of the present invention a heat resistant, flexible teflon hose is used to connect the entry and/or exit communication ports to the coupling devices 200. However, as appreciated by those skilled in the art, any type of ductile, non-flammable material, including metallic materials may be used as a flexible hose. By utilizing flexible hose 190 and couplings 200 to attach adjacent heater/filters 10, kitchen workers can visually see the coupling device and are not required to align rigid coupling devices underneath the flue hood 50.

The coupling device 200 serves the dual function of attaching two or more heater/filters 10 together and additionally providing an airtight seal when the heater/filters 10 are removed for cleaning or other purposes. This assures that potable water or other fluids used within the system are not contaminated during the installation or cleaning of the heater/filters. In a preferred embodiment, a ½" diameter coupling valve 200 is used with either a male or female end attached to either entry or exit communication ports or flexible hose 190 on adjacent heater/filters 10. This allows the coupling valves 200 to quickly be snapped together or apart for installation or removal of the heater/filter 10.

The entry communication port 170 and exit communication parts 180 are connected to a continuous conduit 210 located within the internal perimeter of the frame housing 150. The continuous conduit transports fluid from the communication ports, accepting cool fluid from the entry communication port 170 and discharging warm fluid from the exit communication port 180. The fluid is heated as hot air, grease, and other particulate matter passes over and around the continuous conduit. In a preferred embodiment of the present invention, a conduit 210 with a high heat exchanging capacity is used to transfer the maximum amount of heat from the thermal energy source to fluid circulating inside the conduit 210. In a more preferred embodiment of the present invention, a conduit configuration which provides the maximum amount of conduit surface area is used. FIG. 2 discloses an embodiment in which one end of ½" copper pipe is connected to the entry communication port 170 and is bent to form a series of serpentine loops within a horizontal plane. The other end of the copper pipe is connected to the exit communication port 180.

Attached to the continuous conduit 210 are a series of vanes or fins 220. These fins or vanes 220 serve the dual purpose of transferring heat from the hot fumes to the fluid within the continuous conduit, and to additionally trap grease and other particulate matter entrained in the fumes. This filtering mechanism prevents grease and other particulate matter from accumulating in the flue hood 50 which can create a fire hazard or impede ventilation. In a preferred embodiment of the current invention, the fins 220 are comprised of thin, heat conductive metal material which can withstand high temperatures without deforming or becoming brittle. In the embodiment of FIGS. 2 and 5, the fins 220 are made of aluminum with a thickness no greater than about $\frac{1}{16}$th of an inch, a maximum distance between fins of no greater than about $\frac{1}{8}$th of an inch, and a depth of no less than ½" extending on both the upper and lower side of the continuous conduit. As can be appreciated by those skilled in the art, there are a variety of materials and configurations which can be used for heat exchanging fins.

Figure 3:
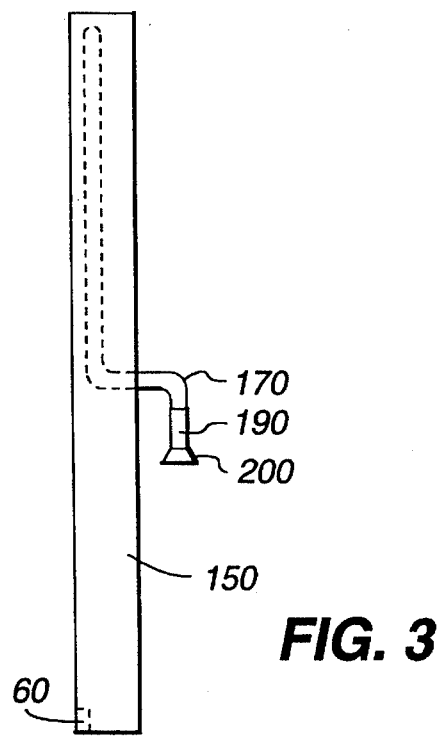
FIG. 3 is a left side view of the combination heater/filter taken along line 3—3 of FIG. 2.

Turning now to a left side view of the current invention, FIG. 3 illustrates a view of the heater/filter 10 taken from line 3—3 as depicted in FIG. 2. As hereinbefore set forth, a communication port 170 (either entry or exit) is attached to the continuous conduit 210 and is extended outward and perpendicular to the frame housing 150. The communication port may then be attached to either a flexible or semi-rigid hose 190 or directly to a coupling 200 if a flexible hose 190 is attached to the corresponding port on an adjacent heater/filter 10.

The coupling device 200 will be fitted with either a male or female connecting device, or any other device known in the art which may quickly be connected and disconnected yet provide an airtight seal. The proper sealing is critical to prevent the contamination or leakage of potable water or other fluids which are being circulated within the heater/filter 10. The coupling device must further be capable of operating at high temperatures over long durations of time without deforming or malfunction. In a preferred embodiment of the current invention a coupling device 200 is used to connect a plurality of heater/filters 10 in series. A person of skill in the art will recognize that various types of coupling devices are available, and that the coupling device may be recessed within the frame housing 150 or externally as shown in FIGS. 2 and 3.

FIG. 4 illustrates an isolated and expanded cutaway sectional view of line 4—4 as depicted in FIG. 2. This drawing depicts the serpentine continuous conduit 210 and attachment of the heat exchanging fins 220. As seen, the continuous conduit 210 is spaced in a manner which optimizes the heat exchanging capacity by exposing the maximum surface area of the continuous conduit 210 to hot fumes. In a preferred embodiment the continuous conduit 210 is aligned in a horizontal plane with heat exchanging fins 220 extending perpendicular to the continuous conduit 210, although any potential combination of fins and continuous conduit 210 may be used as appreciated by one skilled in the art. The diameter of the continuous conduit 210 will depend on the specific components of the application, including heat source available, volume of water required for circulation, inlet and exit temperature differential, etc. In a more preferred embodiment in a commercial or institutional kitchen, the continuous conduit is comprised of ½" copper piping.

Turning now to FIG. 5, a cross-sectional view of the fins 220 can be seen from line 5—5 in FIG. 2. The fins are oriented in a manner which both optimizes the transferring of heat from the hot fumes generated from the thermal energy source and trapping grease and other particulate matter entrained in the fumes. As appreciated by one skilled in the art, there are a variety of shapes, materials and orientations which may be utilized to achieve this purpose. Although the heat exchanging fins may be permanently attached to the continuous conduit 210, in a preferred embodiment of the current invention the fins slide over the continuous conduit 210 and are separated by a fin collar 230. This embodiment prevents the fins 220 from touching and hence maximizes the heat exchanging capacity of the heater/filter 10. In a more preferred embodiment of the present invention, at least about ⅛" separates the centerline between two adjacent fins 220.

What is claimed is:

1. A combination fluid heater and grease filter for use in a kitchen environment, said environment including a heat generating cooking appliance for preparing cooked foods and which also generates grease, fumes and particulate as a result of the cooking process, the combination comprising:

(a) means for exchanging heat including a conduit capable of carrying fluid therethrough, said conduit oriented such that said fumes from said cooking equipment pass over said conduit and transfers heat to said fluid; and (b) means for filtering wherein said conduit is configured such that said grease and particulate matter generated from said cooking appliance attaches to said means for filtering;

(c) means to control the ingress and egress of fluid through said conduit; and (d) temperature control means to automatically maintain the temperature of said heater/filter at least above the melting temperature of grease, whereby the heater/filter is substantially self-cleaning.

2. The heater/filter of claim 1, further comprising a removable container positioned adjacent to said heater/filter and wherein said removable container is oriented to collect said particulate matter and said grease filtered by said heater/filter.

3. The heater/filter of claim 1, wherein said fluid control means comprises a variable orifice valve to regulate the rate of said fluid entering and exiting from said heater/filter.

4. The heater/filter of claim 1, further comprising coupling means to provide fluid communication between multiple heater/filters.

5. The heater/filter of claim 1, wherein said fluid medium is water.

6. The heater/filter of claim 1, wherein said fluid medium comprises a mixture of water and ethylene glycol.

7. A fluid heater and grease filter system for use in a kitchen environment, the environment including a heat generating cooking appliance for preparing cooked foods and which also generates grease, fumes, and particulate as a result of the cooking process, the system comprising:

(a) heat exchanging means, including a conduit capable of carrying fluid therethrough, said conduit oriented such that the heat generated from the cooking equipment passes over said conduit and transfers heat to said fluid;

(b) said conduit further defining a filter means wherein said conduit is configured such that the grease and particulate matter is removed from the fumes generated from the cooking appliance and attaches to said filter means;

(c) fluid control means, wherein the rate of said fluid entering and exiting said combination fluid heater/grease filter is regulated by the monitoring of the temperature of said fluid inside said conduit;

(d) collection means disposed adjacent said filter means to collect the grease and particulate which attaches to said filter means.

8. The combination fluid heater/grease filter of claim 7, further comprising coupling means to provide fluid communication between multiple fluid heater/grease filters.

9. The combination fluid heater/grease filter of claim 7 wherein said fluid inside said conduit is maintained at a temperature at least above the melting point of grease.

10. A system for filtering particulate from hot fumes and heating a fluid circulating through the system, comprising:

(a) a conduit capable of carrying a fluid therethrough, said conduit oriented such that the hot fumes pass thereover through a flue hood, transferring heat to said circulating fluid;

(b) said conduit including a plurality of fins further being oriented to define a filter means such that the particulate from the hot fumes are collected on said conduit and said plurality of fins;

(c) fluid control means, wherein the rate of said fluid entering and exiting said system is regulated by the monitoring of the temperature of said system;

(d) temperature control means, wherein the temperature of said system is automatically maintained above the melting temperature of grease; and (e) collection means disposed adjacent said filter means to collect the particulate which attaches to said filter means.

11. A method for filtering grease and particulate matter from air fumes and utilizing heat released from cooking equipment to heat incoming fluid, comprising:

(a) circulating said fluid into a conduit;

(b) passing said air fumes from said cooking equipment over said conduit;

(c) transferring heat from said gas fumes to said fluid contained in said conduit;

(d) discharging heated fluid from said conduit;

(e) trapping said grease and said particulate matter on said conduit; and (f) collecting said grease and said particulate matter in a vessel; and (g) regulating the rate of fluid circulating through said conduit to maintain the temperature of said fluid above the melting point of grease, whereby said conduit is substantially self-cleaning.

12. The method of claim 11, further comprising rate control means to control the rate of said fluid entering and exiting said conduit.

13. A combination fluid heater/grease filter for use in a kitchen environment, said environment including a heat generating cooking appliance for preparing cooked foods and which also generates grease, fumes and particulate as a result of the cooking process, the combination comprising:

(a) a rectangular body;

(b) said body including first and second fluid communication ports and a serpentine continuous conduit disposed between and interconnecting said ports; said first port adapted to receive fluid from a fluid source and said second port adapted to transmit fluid from said combination fluid heater/grease filter;

(c) a plurality of thin vane members extending from said conduit and oriented to absorb heat and collect grease and other particulate matter;

(d) control means, comprising a temperature sensing device and fluid flow regulation device for controlling the discharge of fluid from said conduit and maintaining the temperature of said fluid in said conduit above a predetermined value.

14. The heater/filter of claim 13, wherein the temperature of said fluid is maintained at least about 25° F. above the melting point of grease.

15. The heater/filter of claim 13, further comprising a removable collection container positioned adjacent to said heater/filter and wherein said heater/filter is oriented to collect said particulate matter and said grease in said removable collection container.

16. The heater/filter of claim 13, further comprising attachment means for attaching said heater/filter to a hood, said hood used to capture and direct said grease, fumes and particulate away from said cooking equipment heat source.

17. The heater/filter of claim 13, further comprising coupling means to provide fluid communication between multiple heater/filters.

18. The heater/filter of claim 13, wherein said fluid medium is water.

19. The heater/filter of claim 13, wherein said fluid medium comprises a mixture of water and ethylene glycol.

20. A method for retrofitting a flue hood assembly located above a heat generating cooking appliance to capture waste heat, said method comprising:

(a) inserting a combined grease filter/heat exchanger in said flue hood assembly;

(b) connecting a inlet fluid line to a inlet communication port of said combined grease filter/heat exchanger and a outlet line to a exit communication port of said combined grease filter/heat exchanger; and (c) connecting said inlet fluid line to a fluid supply source and said outlet line to a fluid return system, whereby heat from said cooking appliance is collected in a fluid passing between said fluid supply source and said fluid return system.

21. The method of claim 20, wherein said method further comprises removing an existing grease filter located above said heat generating cooking appliance and within said flue hood assembly prior to installing said combined grease filter/heat exchanger.

22. The method of claim 20, wherein said method further comprises installing flow control means, to said outlet fluid line, whereby the flow rate of said fluid exiting said exit communication port is regulated.

23. The method of claim 20, wherein said method further comprises installing temperature control means to said combined grease filter/heat exchanger to maintain the temperature of said grease filter/heat exchanger above the melting temperature of grease.

24. The method of claim 20, wherein said method further comprises utilizing said fluid in said fluid return system to provide heat to a kitchen environment.

25. A combination fluid heater and grease filter for use in a kitchen environment, said environment including a heat generating cooking appliance for preparing cooked foods and which also generates grease, fumes and particulate as a result of the cooking process, the combination comprising:

(a) means for exchanging heat including a conduit capable of carrying fluid therethrough, said conduit oriented such that said fumes from said cooking equipment pass over said conduit and transfers heat to said fluid; and (b) means for filtering wherein said conduit is configured such that said grease and particulate matter generated from said cooking appliance attaches to said means for filtering; and (c) control means to regulate the ingress and egress of fluid through said conduit.

26. The combination fluid heater and grease filter of claim 25 wherein said control means is temperature activated.

* * * * *